United States Patent
Abdella et al.

(10) Patent No.: US 11,718,214 B2
(45) Date of Patent: Aug. 8, 2023

(54) MODULAR SEAT WITH CABLE TENSIONING SYSTEM

(71) Applicant: LEAR CORPORATION, Southfield, MI (US)

(72) Inventors: David Abdella, Royal Oak, MI (US); Arjun Yetukuri, Rochester Hills, MI (US); Joshua Hallock, Warren, MI (US); Brandon Landry, Clarkston, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/562,186

(22) Filed: Dec. 27, 2021

(65) Prior Publication Data

US 2023/0202366 A1  Jun. 29, 2023

(51) Int. Cl.
*B60N 2/68* (2006.01)
*B60N 2/70* (2006.01)
*A47C 15/00* (2006.01)
*A47C 7/02* (2006.01)
*B60N 2/72* (2006.01)

(52) U.S. Cl.
CPC .............. *B60N 2/72* (2013.01); *A47C 7/0213* (2018.08); *A47C 15/00* (2013.01); *B60N 2/682* (2013.01); *B60N 2/7041* (2013.01); *B60N 2/7094* (2013.01)

(58) Field of Classification Search
CPC .... B60N 2/7041; B60N 2/682; A47C 13/005; A47C 15/00; A47C 7/0213; A47C 5/10
See application file for complete search history.

(56) References Cited

U.S. PATENT DOCUMENTS

| | | | | |
|---|---|---|---|---|
| 1,418,940 A | * | 6/1922 | Kutschmar | B60N 2/7041 297/218.4 |
| 2,120,036 A | * | 6/1938 | Northup | B60N 2/7041 297/226 |
| 3,706,473 A | * | 12/1972 | Mullen | A47C 13/005 297/118 |
| 3,708,204 A | * | 1/1973 | Wachsmann | A47C 4/03 108/156 |
| 3,944,282 A | * | 3/1976 | Nakamura | A47C 13/005 297/440.14 |

(Continued)

FOREIGN PATENT DOCUMENTS

CN   107161042 A      9/2017
DE   3620533 A1   * 12/1987

(Continued)

*Primary Examiner* — Timothy J Brindley
(74) *Attorney, Agent, or Firm* — Brooks Kushman P.C.

(57) ABSTRACT

A modular seat assembly includes a seat frame, a modular seat component for engaging the seat frame including a mounting bracket, a cable routed towards the frame and engaged with the mounting bracket, and a cable tensioning system. The cable tensioning system is configured to tighten the cable into a tensioned state and release the cable into a slacked state. In the tensioned state, the modular seat component is secured to the seat frame via engagement of the cable with the mounting bracket, and in the slacked state, the modular seat component is releasable from the cable via disengagement of the cable from the respective mounting bracket.

19 Claims, 4 Drawing Sheets

(56) References Cited

U.S. PATENT DOCUMENTS

| | | | | |
|---|---|---|---|---|
| 5,176,424 | A * | 1/1993 | Tobita | A47C 4/54 |
| | | | | 297/452.52 |
| 8,684,466 | B2 * | 4/2014 | Blair | A47C 5/00 |
| | | | | 297/440.13 |
| 10,046,682 | B2 | 8/2018 | Llne et al. | |
| 10,357,109 | B2 | 7/2019 | Nose | |
| 11,191,362 | B1 * | 12/2021 | Brinkley | A45F 3/24 |
| 2009/0045666 | A1 * | 2/2009 | Westendorf | A47C 13/005 |
| | | | | 297/440.1 |
| 2015/0021960 | A1 * | 1/2015 | Eicke | A47C 3/04 |
| | | | | 297/445.1 |
| 2019/0126788 | A1 | 5/2019 | Haller | |

FOREIGN PATENT DOCUMENTS

| | | | | |
|---|---|---|---|---|
| DE | 102019104195 A1 * | 8/2019 | | B60N 2/42 |
| DE | 102019135674 A1 * | 6/2021 | | A47C 13/005 |
| GB | 1585888 A * | 3/1981 | | A47C 4/022 |
| KR | 20210110088 A * | 9/2021 | | |
| WO | 2019/063523 A1 | 4/2019 | | |

* cited by examiner

MODULAR SEAT WITH CABLE TENSIONING SYSTEM

TECHNICAL FIELD

The present application is directed to a modular seatback, and more particularly a cable tensioning system for retaining modular components on a structural seatback frame.

BACKGROUND

Conventional seatbacks typically include a foam cushion disposed on a seatback frame. The conventional seatbacks have a trim cover secured over the foam cushion. The conventional seatbacks include various features within the seatback, such as speakers, trim attachment features, heating components, massage components, lumbar support, and the like. The foam cushion is typically fixed on the seatback frame with all the features embedded therein, thus requiring an extensive assembly process to form the seat. Furthermore, access to the features for service or repair may be limited due to the conventional incorporation of the features.

SUMMARY

According to one or more embodiments, a modular seat assembly includes a seat frame, a modular seat component for engaging the seat frame including a mounting bracket, a cable routed towards the frame and engaged with the mounting bracket, and a cable tensioning system. The cable tensioning system is configured to tighten the cable into a tensioned state and release the cable into a slacked state. In the tensioned state, the modular seat component is secured to the seat frame via engagement of the cable with the mounting bracket, and in the slacked state, the modular seat component is releasable from the cable via disengagement of the cable from the respective mounting bracket.

According to one or more embodiments, a modular seat assembly includes a seat frame defining a plurality of apertures therethrough, a plurality of modular seat components, a cable forming a continuous loop, and a cable tensioning system. The modular seat components engage the seat frame, with each modular seat component including a corresponding mounting bracket, with each mounting bracket having an end portion corresponding to a corresponding aperture of the plurality of apertures, and each end portion forming a routing channel. The continuous loop of the cable is releasably engaged with each mounting bracket via the routing channel, and the cable tensioning system is configured to tighten the cable into a tensioned state and release the cable into a slacked state. In the tensioned state, each end portion is passed through the corresponding aperture such that the modular seat components are mounted on the seat frame via force from the cable on the mounting bracket. In the slacked state, the modular seat components are individually releasable via disengagement of the cable from the corresponding mounting bracket.

According to one or more embodiments, a method of assembling a modular seat assembly includes engaging a modular component with a cable, and tightening the cable via a cable tensioning system to secure the modular component on a seat frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to embodiments of the present disclosure, a cable tensioning system for a modular seat is provided. The modular seat includes seat components held against the structural frame of the seat. The cable tensioning system includes a cable retaining the modular components on the structural frame when the cable is in a tensioned state. Upon releasing pressure on the cable, in a slacked state, the modular components are releasable from the frame so the individual component can be removed, replaced, or serviced. The modular components include a routing bracket to guide and retain the cable such that the cable remains on the bracket when in a slacked state. As such, the components forming the seat can be serviced, repaired, or replaced, without requiring replacement of an entire seating component with working features.

Figure 1:
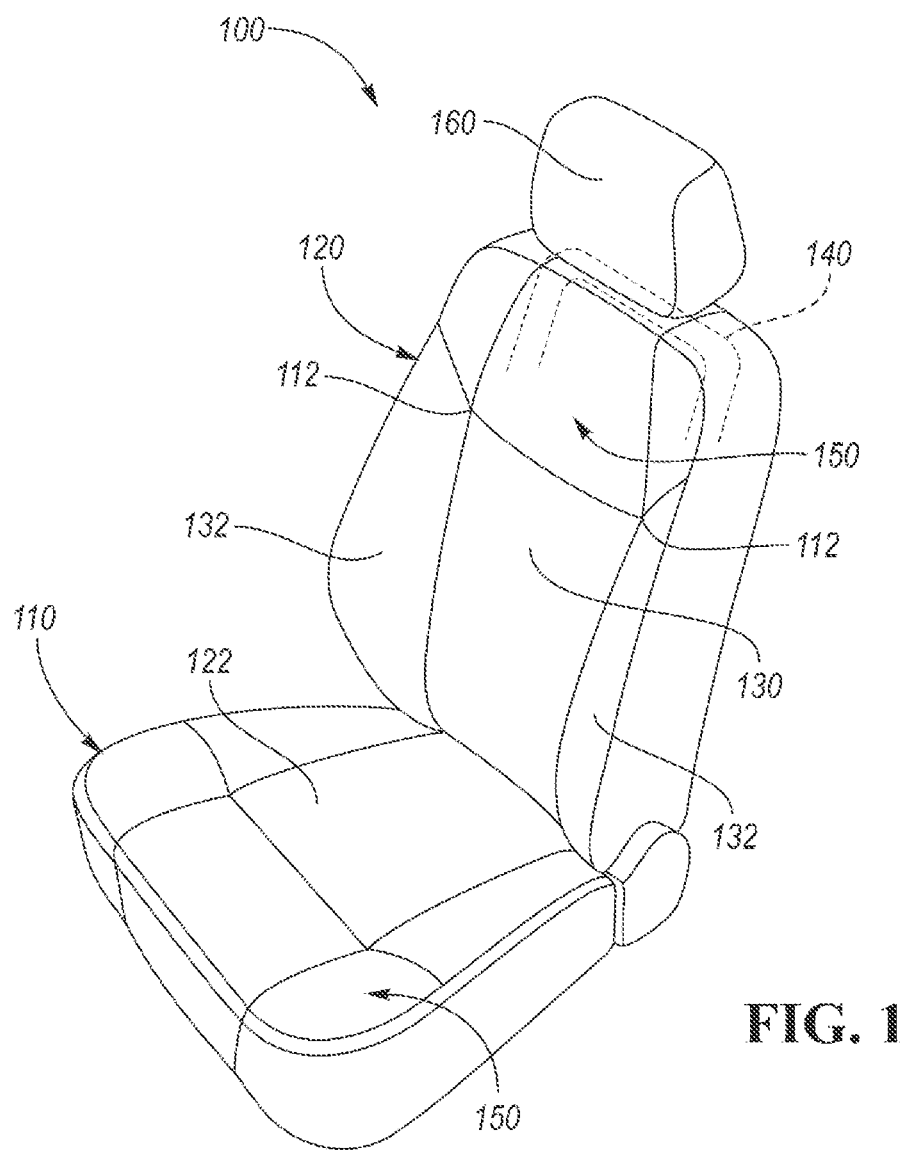
FIG. 1 illustrates a perspective schematic illustration of a representative modular seat assembly according to an embodiment.

Referring to FIG. 1, one embodiment of a seat assembly 100 is shown. While the vehicle seat assembly 100 is illustrated in FIG. 1 to be a bucket seat assembly, it should be understood that the principles of the present disclosure are applicable to other types of seat assemblies, such as bench, captain and other seat assemblies. Still further, it should also be understood that the principles of this disclosure are applicable to all types of vehicle seat assemblies as well as non-vehicle seat assemblies, and discussion of a vehicle seat is not intended to be limiting. The seat assembly 100 can be configured for use in a vehicle, such as motor vehicle like a car or truck, or for use in non-vehicular applications.

The seat assembly 100 includes a seat bottom 110 and a seat back 120 pivotally disposed on the seat bottom 110. The seat bottom 110 is mountable to a surface such as a vehicle floor. The seat bottom 120 may be mounted on a seat frame (not shown) which can be removably secured to the vehicle floor. In some embodiments, the seat back 120 may include a head restraint 160. Although FIG. 1 shows a vehicle seat assembly with the headrest 160, seat assembly designs may be constructed without the headrest 160, as shown in FIG. 2, or the headrest 160 may be removable attached or pivotally attached based on design considerations of the vehicle interior.

Referring again to FIG. 1, the seat assembly 100 includes a plurality of modular components 200 which form the seat back 120 and/or the seat bottom 110. The seat back 120 and/or the seat bottom 110 are formed in a modular structure to form the seat assembly 100, and will be discussed in further detail below. In certain embodiments, both the seat bottom 110 and the seat back 120 are formed in a modular structure, such that each of the seat bottom 110 and seat back 120 include a plurality of modular components 200 mounted to the seat frame 140 (not shown in FIG. 1), that collectively form each of the respective seat bottom 110 and the seat back 120. Thus, although in the Figures only the seat back 120 is shown with the modular structure, it is contemplated that the seat bottom 110 may also be formed of a modular structure, and depiction and discussion of seat back modular components is not intended to be limiting. Moreover, discussion of any particular modular seat back components is not intended to be limiting, and there may be other features of the modular components that may be applied to seat bottom modular components. As such, discussion of a modular components 200 of the seatback 120 may also be applicable to a modular seat bottom 110, and discussion of a seatback 120 is not intended to be limiting and may hereinafter be interchangeable with a seat bottom 110.

Thus, the modular structure allows for the individual modular components 200 to be manufactured in one facility, and shipped efficiently to another facility for final assembly to form the seat assembly 100. The modular components 200 may be any particular part of the seat assembly 100 to form the seat back 120 or the seat bottom 110, such as, but not limited to, side bolsters (e.g., upper side bolsters 202, lower side bolsters 204), center regions 206, head supports, thigh supports, etc. or any other components to meet a selected design for the seat assembly 100. The individual modular components 200 include one or more features (e.g., electronics or comfort features) for the seat assembly, such as speakers, trim attachment features, heating components, massage components, lumbar support, electrical wiring, electrical connections, pneumatics, airbag(s), foam layers, trim covers, etc. Each modular component 200 includes a substrate (e.g, foam) supported on a carrier, with the feature embedded therein or disposed on the carrier between the substrate and the carrier. Each modular component with the feature included therein can be transported for final assembly (e.g., trimming, mounting on the seat frame, etc.). Thereafter, the individual components can be serviced or replaced if the feature in the individual modular component requires repair. Thus, each of the modular components 200 can be independently fully trimmed (as shown in FIG. 1) with a respective trim cover 150 which cooperate to provide an exterior seating surface, also known as the A-surface, which can be an occupant support surface for the seat assembly 100. Each trim cover 150 includes a trim cover that is made of at least one suitable material, such as, but not limited to, leather, synthetic leather, vinyl, fabric, synthetic suede, non-woven fabric, or combinations thereof (fabric-to-fabric, leather-to-leather, fabric-to-leather, leather-to-fabric, etc.). It should be understood that each modular component may have a different trim cover assemblies as based on the desired aesthetics for the seat assembly 100 or as based on the specific modular component and its capability (e.g., heating, cooling, massage, etc.). As such, the trim covers for each modular component 200 can not only differ from the seat bottom 110 to the seat back 120, but from modular components forming the upper side bolsters 202 may vary from the lower side bolsters 204 and the central region 206.

Figure 2:
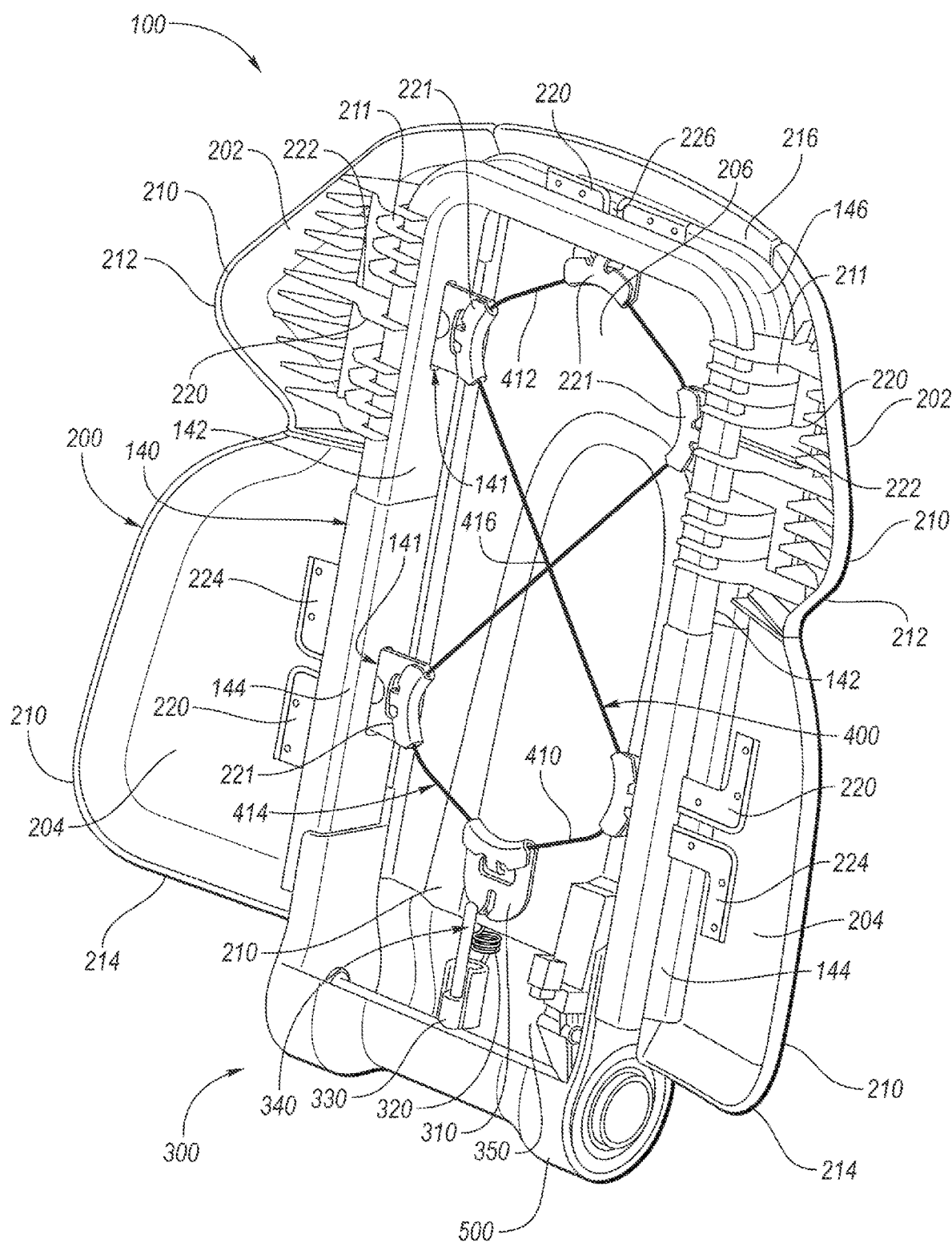
FIG. 2 is a schematic illustration of a modular seat assembly with a cable tensioning system, according to an embodiment.

Referring to FIG. 2, the seatback 120 is shown with the carriers (collectively, carriers 210) of the modular components 200, without the substrate (e.g., foam), trim, or embedded features. The modular components 200 include upper side bolsters 202 with respective carriers 212, lower side bolsters 204 with respective carriers 214, and a center region 206 with a respective carrier 216. The carriers 210 for the modular components 200 are each releasably mounted to the seat frame 140 via a respective mounting brackets (collectively, mounting brackets 220) such that upon mounting to the seat frame 140, the modular components 200 cooperate to form the seatback 120. As such, the carriers 212 of the upper side bolsters 202 are mounted to the seat frame 140 via the mounting bracket 222, the carriers 214 of the lower side bolsters 204 are mounted to the seat frame 140 via the mounting bracket 224, and the carrier 216 of the center region 206 is mounted to the seat frame 140 via the mounting bracket 226. Each of the mounting brackets 220 may be attached to the carriers 210 in any suitable manner, including, but not limited to mechanical fasteners, interference fit, or may be integrated together as a single piece (e.g., injection molding). Additional features may be included on the carriers 210 (for example, prongs 211 molded thereon) that can engage corresponding slots in the frame 140 to facilitate retention on the frame 140. Furthermore, although a single mounting bracket 220 is shown for each carrier 210, each carrier 210 may include any number of mounting brackets 220 for securely mounting the carrier 210 to the seat frame 140, and depiction of a single mounting bracket 220 per carrier 210 is not intended to be limiting.

Referring again to FIG. 2, the seat frame 140 includes structural frame members (e.g., upper upright frame members 142, lower upright frame members 144, and lateral frame member 146) which accept the individual modular components 200 thereon. The seat frame 140 may be any suitable seat frame, including, but not limited to, a stamped frame, a roll formed frame, an extruded frame, a hydroformed frame, a molded frame, a cast frame, etc., and may include any number of members to form the seat frame 140 which may be independent members which are connected together or integrated members, as dependent on the manufacturing consideration of the seat frame 140. The seat frame 140 includes an aperture 141 as a receiving geometry defined in the frame members corresponding to receiving a portion 221 of the mounting brackets 220 therethrough, and retains the modular components 200 on the frame via a cable tensioning system 300 and a cable 400. The receiving geometry is sized and shaped based on the portion 221 of the mounting brackets 220 that will be received therein.

The mounting brackets 220 define a structure for guiding and retaining the cable 400 thereon so the cable 400 will not slip off of the mounting bracket 220 when cable is slacked. The mounting brackets 220 each include a cable retention feature thereon for forming a routing channel for the cable and retaining the cable on the mounting bracket 220. In the embodiments shown in the Figures, the cable retention feature includes a curved hook 230 on an end 223 of the portion 221 of the mounting bracket 220. The curved hook 230 forms a routing channel 240 for receiving the cable 400 therein. The end 223 of the portion 221 further includes an opening 250 adjacent to the routing channel 240. In the embodiments shown in the Figures, the cable retention feature further includes a tab 235 on the curved hook 230 which extends from the curved hook 230 and has a distal end that protrudes through the opening 250. Thus, the cable 400 can be seated in the routing channel 240 and retained via the tab 235 on the portion 221 of the mounting bracket 220. The portion 221 of the mounting brackets 220 can be seen in greater detail in FIGS. 4A-G, and securing the modular components 200 to the mounting brackets 220 will be discussed further with respect to these Figures.

Referring again to FIG. 2, the cable 400 cooperates with the mounting bracket 220 to secure the modular components 200 to the seat frame 140, with the cable 400 having a tensioned state via the cable tensioning system 300 to hold the modular components 200 on the seat frame 140. The cable 400 defines a continuous loop 410 without an end. However, in certain embodiments, each modular component 200 may have its own cable 400 that can be tightened and/or released using a corresponding cable tensioning system 300, and depiction of a single cable is not intended to be limiting. The cable 400 may be any suitable material capable of withstanding loads on the seatback 120, such as, for example, steel, plastic-coated steel, woven materials (e.g., carbon or aramid fibers), or other high strength cording or fiber materials. As such, the carriers 210 are releasably secured to the seat frame 140 via engagement of the cable 400 with the mounting bracket 220, and held under tension by the cable 400 and the cable tensioning system 300. The cable 400 is routed with respect to the seat frame 140 to hold the modular components 200 when the cable 400 is held in tension. The apertures 141 in the seat frame 140 facilitate routing of the cable 400, as well as facilitate engagement of the cable 400 with the mounting brackets 220 by allowing the cable 400 to be pushed outward through the aperture 141 for cooperation with the portion 221 of the mounting bracket 221, as will be discussed in further detail with reference to FIGS. 4A-G. The cable 400 may be a continuous loop 410 that may be tensioned in any suitable configuration to retain the mounting brackets 220 on the seat frame 140, such as, for example, a cross-lace configuration as shown in FIG. 2 to improve the direction of tension on the cable 400 at the mounting brackets 220. Generally, the cable may be routed through the inner side of the periphery defined by the seat frame, while the modular components are engaged with the frame on the outer side of the periphery. As shown in FIG. 2, the cable 400 in the cross-lace configuration includes a top loop 412 and a bottom loop 414, formed by the crossing of the continuous loop 410 at middle crossing 416. Although shown with a single middle crossing 416, the continuous loop 410 may be crossed any suitable number of times (as in a shoe lace), as based on the structure of the seat assembly 100 and the number of modular components 200 being secured to the frame 140. The cross-lace configuration provides a specific direction of tension on each of the mounting brackets 220 as based on the routing of the cable 400. For example, through the top loop 412, the cable 400 routes through the mounting brackets 222, 226 for the carriers 212, 216 of the upper side bolsters 202 and the center region 206. Through the bottom loop 414, the cable 400 routes through the mounting brackets 224 for the carriers 214 of the lower side bolsters 204. The bottom loop 414 also includes the cable 400 routed to engage the cable tensioning system 300 such that the cable 400 can be in a tensioned state where the cable 400 is held taught such that the mounting brackets 220 are pulled in the direction of the looped cable 410 and held against the frame 140, or in a slacked state where the mounting brackets 220 can be released from engaging the cable 400 for removal of the modular components 200. Although not shown, in certain embodiments, upon engagement of the modular components 200 with the seat frame 140, electrical contacts on each of the respective modular components 200 and the seat frame 140 (via electrical connections) may be made to provide power or data to electronic features of the modular components 200. Further details of release and engagement of the cable 400 and its retention on the mounting bracket 220 will be discussed with reference to FIGS. 3A-F and FIGS. 4A-G.

Figure 3A:
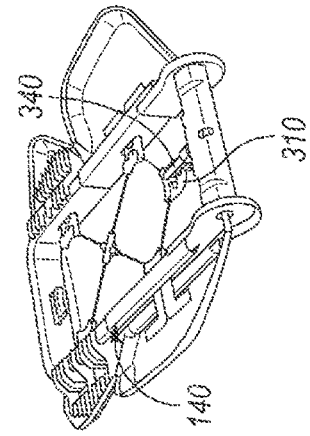
FIGS. 3A-F show a schematic illustration of a process for releasing a modular component via a cable tensioning system.

Referring again to FIG. 2, the cable tensioning system 300 is positioned at the bottom end of the seat back 120, towards the center of the center region 126. In at least one embodiment, as can be seen in FIGS. 3A-B, components of the cable tensioning system 300 may be covered by a closeout cover 500 to hide the cable tensioning system 300 from view. The cable tensioning system 300 includes a cable tensioning bracket 310 engaging the cable 400 at the bottom loop 414 of the continuous loop 410. The cable tensioning bracket 310 is configured to pull downward (relative to the height of the seat back 120) on the cable 400 to tension the cable 400 such that the mounting brackets 220 are held against the frame 140 or move upward to release tension on the cable 400 to allow the modular components 200 to be released from the frame 140 by slacking the cable 400. The cable tensioning bracket 310 may be similarly configured to the portion 221 of the mounting brackets 220, or may be a separate configuration for engaging the cable 400. The cable tensioning system 300 further includes a retention spring 320 and a retention spring adjustment bracket 330. Furthermore, the cable tensioning system 300 includes a cable tensioning mechanism 340, and a tensioner anchor bracket 350 for anchoring the cable tensioning system 300 toward the bottom of the seat back 120. The tensioning mechanism 340 may be able suitable mechanism for tensioning the cable 400, including, but not limited to, a cable tensioning screw, as shown in the Figures. Depiction of a screw as the tensioning mechanism 340 is not intended to be limiting. For example, the tensioning screw may be a knob, slider, solenoid, gearbox, or other feature that can apply and release tension on the cable 400. As such, the cable tensioning mechanism 340 upon activation can move the cable 400 between a tensioned state, where the modular components 200 are held with pressure against the frame 140, and a slacked state, where the cable 400 is slacked such that the modular components 200 can be released from the cable 400 via movement of the cable tensioning bracket 310. In addition, the tensioning mechanism 340 may have a unique type of drive or include a locking mechanism, similar to a tire locking nut to limit loosening of the cable 400 to authorized personnel. In other embodiments, the cable tensioning system 300 could be accessible to a consumer to allow removal and/or replacement of modular components for upgrades, repairs, or style customization. The cable tensioning system 300 may be configured to apply a specified torque range to ensure proper retention of the modular components via the design of the individual components (e.g., screw or spring). As such, a predefined amount of tension is required to secure the individual modules 200 to the frame 140, which is generated via tightening of the tensioning mechanism 340 and moving the tensioner anchor bracket 350 to generate the load on the cable 400. The retention spring 320 is positioned between the tensioning mechanism 340 and the tensioner anchor bracket 350 and provides a continuous load on the tensioning anchor bracket 350 to maintain tension on the cable 400 as the seatback 120 deflects under loads (e.g., either while an occupant leans back in the seat or during an impact event).

In embodiments where the cable tensioning mechanism 340 is a tensioning screw, as shown in the embodiments of the Figures, upon rotation in a first direction of the screw, the cable tensioning bracket 310 moves upward to release the tension on the cable 400 such that the portions 221 of the mounting brackets 220 can be removed through the apertures 141 from the seat frame 140, and subsequently unhooked from the continuous loop 410 of the cable 400. Upon rotation of the screw in a second direction, opposite to the first, the cable tensioning bracket 310 moves downward to pull the cable 400 into a tensioned state such that the mounting brackets 220 are held against the frame 140. The retention spring 320 is secured to the retention spring adjustment bracket 330 towards the bottom of the seat back 120 (underneath the tensioning mechanism 340) to ensure retention of the modular components 200 under loading. For example, the retention spring 320 may apply a force to the tensioning bracket to bias the tensioning bracket in the tensioned state.

Figure 3C:
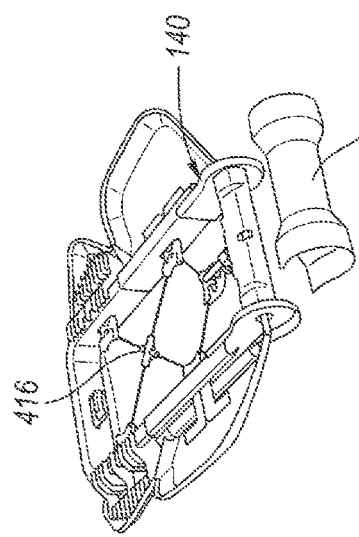
Figure 3E:
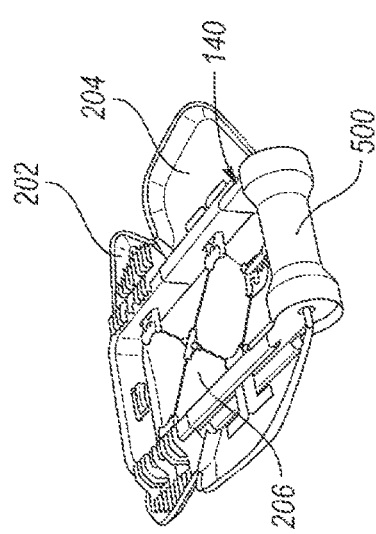
Figure 3B:
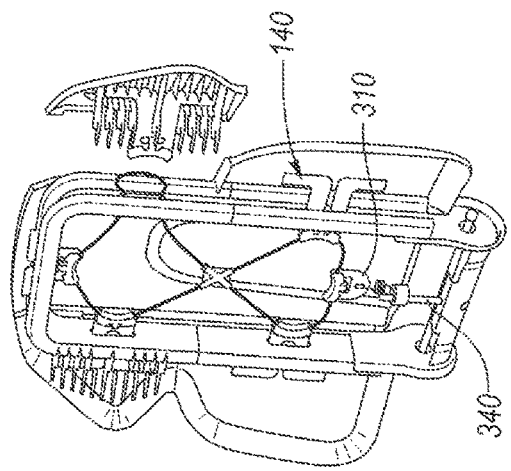
Figure 3D:
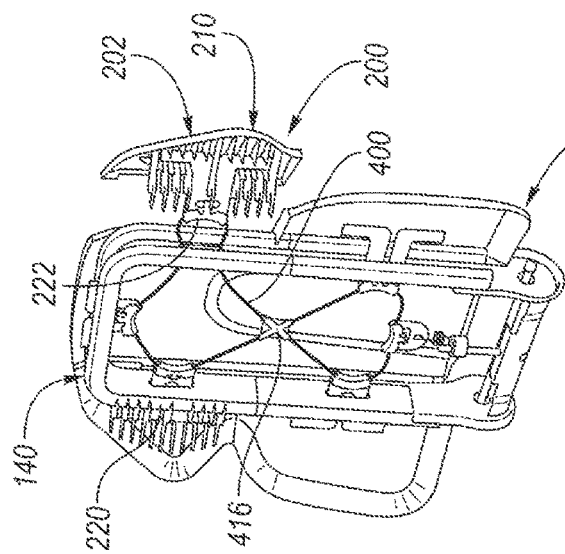
Figure 3F:
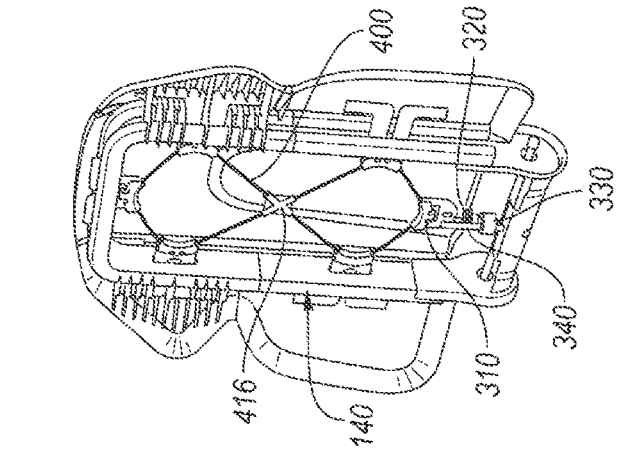

Referring to FIGS. 3A-F, the removal of a modular component 200 via the cable tensioning system 300 is shown according to an example. In the example of FIGS. 3A-F, the upper side bolster 202 is shown for removal via the cable tensioning system 300. The removal of other modular components 200 is similar to the depiction of the removal of the upper side bolster 202. In FIG. 3A, the seat back 120 is in the tensioned state, with the modular components 200 all secured to the frame 140 via the mounting brackets 220. The seat back 120 is in the reclined position in preparation for accessing the cable tensioning system. In FIG. 3B, the closeout cover 500 is removed to provide access to the cable tensioning system 300. In FIG. 3C, the cable tensioning mechanism 340 is activated/engaged to release tension on the cable 400 to move the modular components 200 from being in the tensioned state to the slacked state. Particularly, in the example shown in FIG. 3C the cable tensioning mechanism 340 is a tensioning screw which is rotated to release tension on the cable 400. In FIG. 3D, as the cable tensioning mechanism 340 is activated/engaged, the cable tensioning mechanism 340 moves the cable tensioning bracket 310 (which the cable 400 is routed through) upward to release the tension on the cable 400 to put the cable tensioning system 400 in the slacked state. In the slacked state, as shown in FIG. 3E, the upper side bolster 202 can be pulled away from the seat back 120 such that the mounting bracket 222 of the upper side bolster 202 is removed from the corresponding aperture 141 in the frame 140. As is shown in FIG. 3E, the cable 400 is still routed through the routing channel 240 of the mounting bracket 222 of the upper side bolster 202 and held on the curved hook 230 via the tab 235 such that the cable 400 is retained on the end 223 of the portion 221 of the mounting bracket 222 for the upper side bolster 202. The cable 400 can be manually unhooked from the mounting bracket 222, as shown in FIG. 3F, to release the upper side bolster 202 from the seat assembly 100. The features of the mounting brackets 200 maintain retention of the cable 400 thereon until manually removed. The cable 400 is unhooked by removal of the cable 400 from the routing channel 240 and over the tab 235 via pushing the cable 400 through the opening 250 and over the tab 235 to release the cable 400 from engagement with the end 223 of the portion 221. As such, the upper side bolster 202 or features incorporated in the upper side bolster 202 can be serviced, repaired, or replaced without removal of other components or features of the seat assembly 100.

Figure 4D:
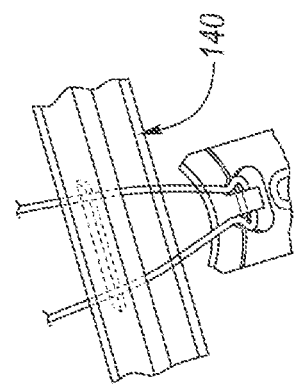
FIGS. 4A-G show a schematic illustration of a process for installing a modular component via a cable tensioning system, according to an embodiment.
Figure 4C:
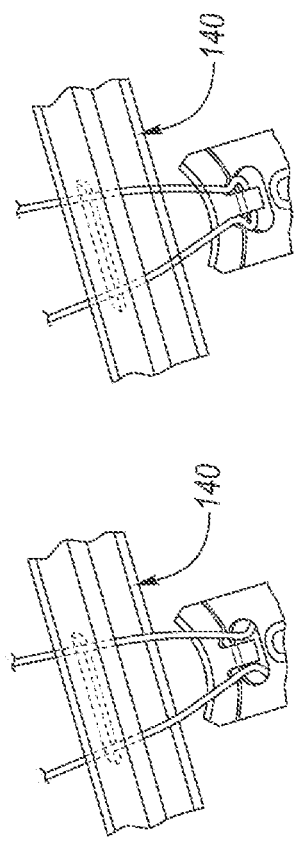
Figure 4B:
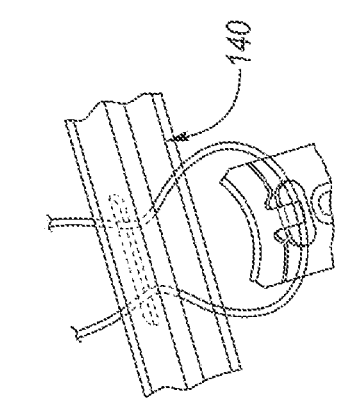
Figure 4A:
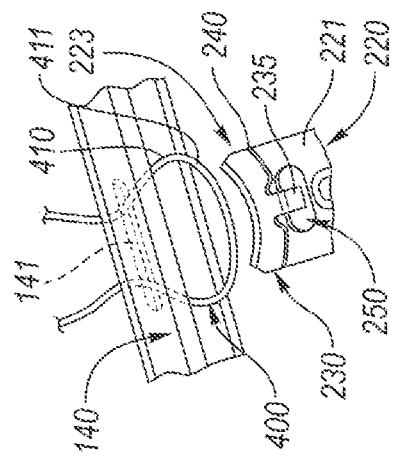
Figure 4G:
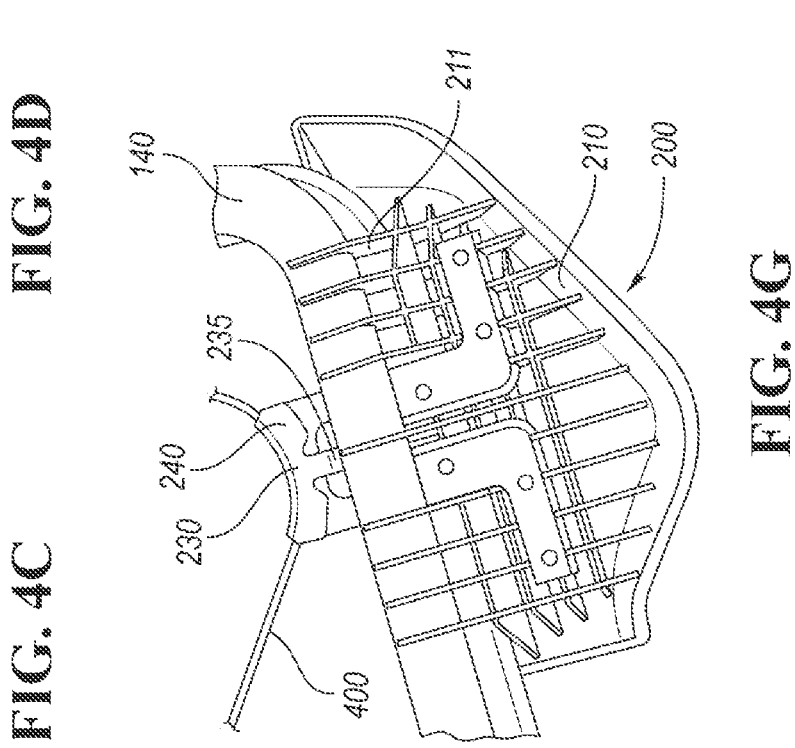
Figure 4F:
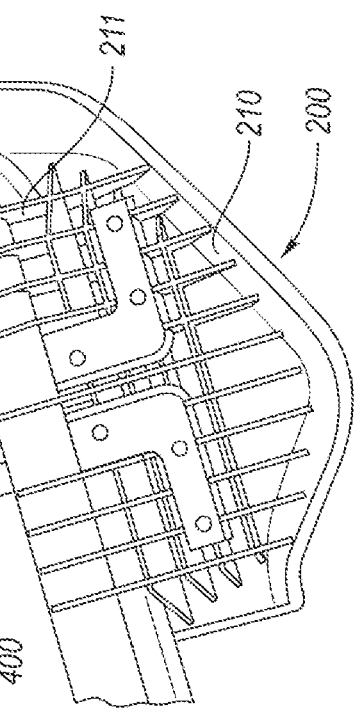
Figure 4E:
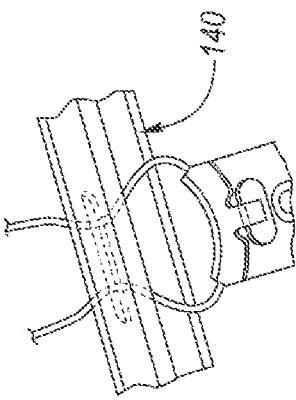

Referring to FIGS. 4A-G, the installation of a modular component 200 using the cable 400 and cable tensioning system 300 is shown in more detail. Particularly, in FIGS. 4A-G, the features of the mounting brackets 220 and the installation process for the cable 400 thereon, are shown in closer detail. As shown in FIG. 4A, a portion 411 of the continuous loop 410 of the cable 400 is looped through the aperture 141 that forms the receiving geometry in the frame 140, and the portion 221 of the mounting bracket 220 of the modular component 200 is brought adjacent to the frame 140. As shown in FIG. 4B, the portion 411 of the cable 400 is looped over the end 223 of the portion 221, and over the curved hook 230 of the mounting bracket 220. The portion 411 of the cable 400 is then pushed through the opening 250 defined in the portion 221, as shown in FIG. 4C, and hooked over and behind the tab 235 that extends from the curved hook 230 into the opening 250, as shown in FIG. 4D. After being hooked behind the tab 235, the portion 411 of the cable 400 is pulled around the curved hook 230 to route the cable 400 as shown in FIG. 4E. In FIG. 4F, the portion 411 of the cable 400 is then inserted and seated in the routing channel 240 of the curved hook 230, and is prevented from slipping out of the routing channel 240 of the curved hook 230 by the tab 235. In FIG. 4G, the modular component 200 is pushed into the frame 140 such that the portion 221 of the mounting bracket 220 is received through the aperture 141, such that the cable tensioning system 300 can then tighten the cable 400 into the tensioned state to retain the modular component 200 on the frame 140. Although not shown in FIG. 4G, other features may engage upon retention of the modular component 200 on the frame 140, such as, but not limited to, additional retention features, data connection points, or electrical contacts, as based on the features incorporated in the modular component 200. For example, as shown in FIG. 4G, the carrier 210 includes prongs 211 molded thereon that engage corresponding slots in the frame 140 to facilitate retention on the frame 140.

According to one or more embodiments, a method of operating a modular seat back includes assembling and disassembling one or more modular components from the seat frame. The assembling includes engaging a mounting bracket on a modular component of the seat back with a continuous cable, tensioning the cable to pull a portion of the mounting bracket through an aperture in a seat frame; and holding the mounting bracket in tension against the seat frame. Engaging the mounting bracket with the cable includes inserting a loop of the cable through an opening in the mounting bracket and behind a tab protruding through the opening, and routing the loop into a routing channel formed by a curved hook at an end of the mounting bracket. Tensioning the cable may include activating a cable tensioning mechanism to tension the cable such that the seat assembly is in a tensioned state. The cable tensioning mechanism may be a tensioning screw that when rotated in a first direction tensions the cable, and when rotated in a second direction, opposite the first, slacks the cable. The cable tensioning mechanism tensions the cable by moving a cable tensioning bracket which engages the cable. The disassembling includes releasing tension on the cable such that the seat assembly is in a slacked state. The disassembling further includes removing the cable from the mounting bracket such that the modular component can be removed from engagement with the frame.

According to one or more embodiments, a seat includes a seat frame having an aperture defined as a receiving geometry to receive mounting brackets of modular components therethrough to retain and release the modular components on and from the seat frame via a cable and cable tensioning system which draw the modular components into the design position and retain the modular components on the frame through constant pressure. The modular components facilitate containment, reduction of cost of assembly, and customization of the components of the seat as the modular components are fully assembled and trimmed. The modular components also can be electrically connected to a power supply via contacts that are engaged when the modular component is secured to the frame. The cable tensioning system allows the modular components to be held in place and released from the frame for servicing the seat assembly or customizing/upgrading particular modular components via engagement of the cable with the mounting bracket on the individual modular components. Upon engaging the mounting bracket with the cable and pushing the mounting bracket through the aperture of the frame, the cable tightening system (which is accessible from the bottom of the seat back) is engaged to tighten the cable to secure modular components on the frame.

As such, the individual modular components are attached to a structural frame to form a seat via a cable and cable tensioning system, without requiring tool access such that the modular components can be removed for service, repair, or replacement by slacking the cable and pulling module away from frame.

Except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to transparency as measured by opacity). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular seat assembly comprising:
   a seat frame;
   a modular seat component for engaging the seat frame, the modular seat component including a mounting bracket;
   a cable routed towards the frame and engaged with the mounting bracket; and
   a cable tensioning system configured to tighten the cable into a tensioned state and release the cable into a slacked state,
   wherein in the tensioned state, the modular seat component is secured to the seat frame via engagement of the cable with the mounting bracket, and in the slacked state, the modular seat component is releasable from the cable via disengagement of the cable from the respective mounting bracket.

2. The modular seat assembly of claim 1, wherein the mounting bracket includes an end portion with a curved hook defining a routing channel for the cable therein.

3. The modular seat assembly of claim 2, wherein the seat frame defines an aperture sized to receive the end portion therethrough when the cable is in the tensioned state.

4. The modular seat assembly of claim 1, wherein the cable tensioning system includes a tensioning bracket that engages the cable, the tensioning bracket being movable between a first position associated with the tensioned state and a second position associated with the slacked state to tension and slack the cable, respectively.

5. The modular seat assembly of claim 4, wherein the tensioning bracket is movable upward with respect to a height of the seat frame from the first position to the second position to release the cable to the slacked state, and downward from the second position to the first position to tension the cable to the tensioned state.

6. The modular seat assembly of claim 4, wherein the tensioning bracket is movable via a tensioning mechanism.

7. The modular seat assembly of claim 6, wherein the tensioning mechanism is a screw, a solenoid, or a gear.

8. The modular seat assembly of claim 4, further comprising a retention spring configured to bias the tensioning bracket toward the first position upon loading of the seat frame.

9. A modular seat assembly comprising:
   a seat frame defining a plurality of apertures therethrough;
   a plurality of modular seat components for engaging the seat frame, each modular seat component including a corresponding mounting bracket, with each mounting bracket having an end portion corresponding to a corresponding aperture of the plurality of apertures, each end portion forming a routing channel;
   a cable forming a continuous loop, with the continuous loop being releasably engaged with each mounting bracket via the routing channel; and
   a cable tensioning system configured to tighten the cable into a tensioned state and release the cable into a slacked state,
   wherein in the tensioned state, each end portion is passed through the corresponding aperture such that the modular seat components are mounted on the seat frame via force from the cable on the mounting bracket, and in the slacked state, the modular seat components are individually releasable via disengagement of the cable from the corresponding mounting bracket.

10. The modular seat assembly of claim 9, wherein the cable tensioning system includes a cable tensioning bracket engaged with the cable and movable relative to the seat frame such that the cable is tightened to the tensioned state and released to the slacked state upon movement of the cable tensioning bracket.

11. The modular seat assembly of claim 10, wherein the cable tensioning bracket is movable via activation of a tensioning mechanism.

12. The modular seat assembly of claim 9, wherein each end portion of each mounting bracket defines an opening adjacent to a curved hook forming the routing channel, and includes a tab protruding from the curved hook and extending into the opening such that the cable is looped behind the tab for insertion into the routing channel.

13. The modular seat assembly of claim 12, wherein the curved hook and the tab cooperate to retain the cable in the routing channel when the cable is in the slacked state.

14. The modular seat assembly of claim 9, wherein the modular seat components comprise upper side bolsters, lower side bolsters, center regions, or combinations thereof.

15. The modular seat assembly of claim 9, further comprising a first electrical connection on the seat frame and a second corresponding electrical connection on the modular seat component, wherein the first and second electrical connections are configured to electrically connect to one another when the cable is in the tensioned state and the modular seat component is mounted on the seat frame to supply power and/or transmit data to the modular seat component.

16. The modular seat assembly of claim 9, wherein the seat frame defines a periphery with the modular seat components on an outer side of the periphery and the cable on an inner side of the periphery.

17. The modular seat assembly of claim 16, wherein the cable is in a cross-lace configuration on the inner side.

18. A method of assembling a modular seat assembly comprising:

engaging a modular component with a cable;

tightening the cable via a cable tensioning system to secure the modular component on a seat frame; and inserting a portion of a mounting bracket of the modular component in a corresponding aperture defined by the seat frame such that tightening the cable secures the modular component on the seat frame.

19. The method of claim 18, wherein engaging the modular component with the cable includes looping the cable over the mounting bracket of the modular component and seating the cable in a routing channel defined by the mounting bracket.

* * * * *